US007300482B2

(12) United States Patent
North

(10) Patent No.: US 7,300,482 B2
(45) Date of Patent: Nov. 27, 2007

(54) PARTICLE SEPARATION APPARATUS

(76) Inventor: John Herbert North, 21 Briar Court., Guardian Road, Norwich, Norfolk NR5 8PR (GB)

( * ) Notice: Subject to any disclaimer, the term of this patent is extended or adjusted under 35 U.S.C. 154(b) by 261 days.

(21) Appl. No.: 10/501,618

(22) PCT Filed: Aug. 27, 2003

(86) PCT No.: PCT/GB03/03761

§ 371 (c)(1),
(2), (4) Date: Jul. 14, 2004

(87) PCT Pub. No.: WO2004/020107

PCT Pub. Date: Mar. 11, 2004

(65) Prior Publication Data

US 2005/0081496 A1 Apr. 21, 2005

(30) Foreign Application Priority Data

Aug. 31, 2002 (GB) ................................ 0220277.8

(51) Int. Cl.
*B01D 46/00* (2006.01)

(52) U.S. Cl. ....................... 55/312; 55/417; 55/DIG. 3; 137/542

(58) Field of Classification Search ........... 137/533.11, 137/533.12, 533.13, 533.14, 533.15, 539, 137/539.5, 542; 55/417, 420, 419, 383, 309, 55/310, 311, 312, 313, 345, 467, DIG. 3; 96/397, 399, 400, 403, 421; 15/353, 347, 15/300.1

See application file for complete search history.

(56) References Cited

U.S. PATENT DOCUMENTS

| | | | | |
|---|---|---|---|---|
| 2,515,425 | A * | 7/1950 | Restemeier | 55/311 |
| 3,742,975 | A * | 7/1973 | Kazama et al. | 137/331 |
| 4,020,525 | A * | 5/1977 | Fromknecht et al. | 15/339 |
| 4,320,696 | A * | 3/1982 | Daniels et al. | 454/323 |
| 5,004,009 | A * | 4/1991 | Bunce | 137/512.3 |
| 5,183,075 | A * | 2/1993 | Stein | 137/493.6 |
| 5,201,095 | A * | 4/1993 | Choi | 15/339 |
| 5,623,958 | A * | 4/1997 | Bumpers | 137/269 |
| 5,960,486 | A * | 10/1999 | Huliganga | 4/447 |
| 6,231,649 | B1 * | 5/2001 | Dyson et al. | 96/403 |

* cited by examiner

*Primary Examiner*—Duane Smith

*Assistant Examiner*—Robert A Clemente

(74) *Attorney, Agent, or Firm*—Barnes & Thornburg LLP

(57) ABSTRACT

Particle separation apparatus comprises a cyclone particle separating means, a particle collecting chamber and a fan driven by an electric motor for drawing particle laden air into and through the apparatus. A valve is provided, upstream of the suction fan driving motor and downstream of the cyclone particle separating means, which includes a valve closure and a valve seat against which the closure is normally resiliently urged to prevent air flowing through the valve. The valve seat is a circular opening and the closure is at least hemispherical with its convex curved surface towards the seating.

12 Claims, 1 Drawing Sheet

PARTICLE SEPARATION APPARATUS

FIELD OF THE INVENTION

Figures 1, 2, 3, 4:
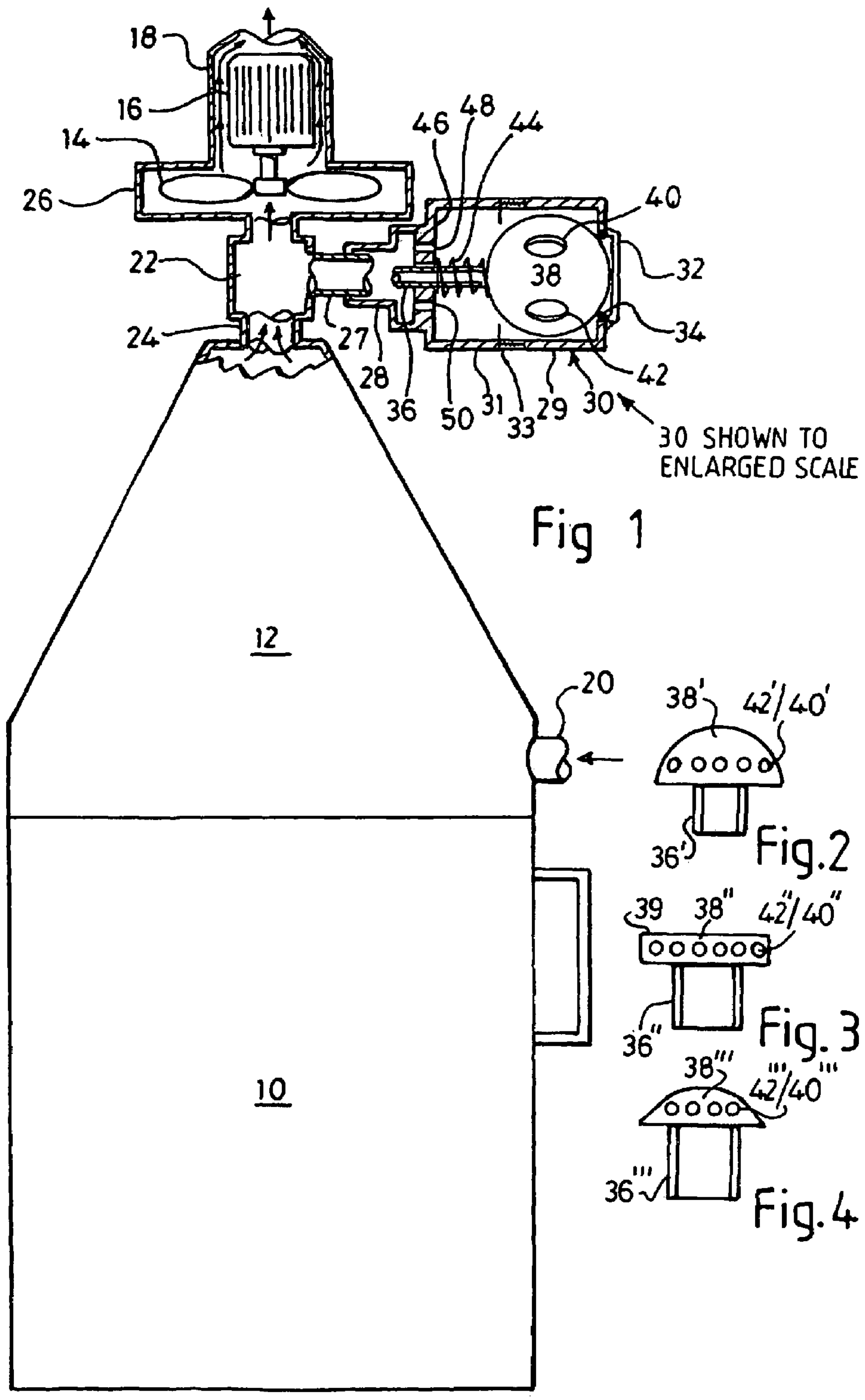

This invention concerns particle separation apparatus which employs at least one cyclone to separate particles from air drawn into the apparatus by a suction device comprising an electric motor driven fan downstream of the cyclone.

BACKGROUND

In such apparatus it is possible for the inlet to the cyclone (or a passage leading from one cyclone to another) to become blocked due to a build up of dust and dirt drawn into the apparatus and not separated by the cyclone action. This reduces the airflow through the cyclone and suction producing fan which becomes cumulative, since reduced airflow reduces the separation efficiency of the cyclone on other dust and dirt entering the cyclone, thereby enabling this material to exit the cyclone with the air stream instead of remaining in the dust collecting region of the apparatus.

Where the airflow is also designed to cool the electric motor driving the suction fan, the reduced airflow through the apparatus could cause the motor to overheat and even burn out.

It is an object of the present invention to provide a means by which an airflow is maintained over the fan motor even if the separation apparatus has become partially or completely blocked upstream of the fan.

SUMMARY OF THE INVENTION

According to the present invention a valve is provided, upstream of the suction fan driving motor and downstream of the cyclone separating means of a particle separation apparatus, which includes a valve closure and a valve seat against which the closure is normally resiliently urged to prevent air flowing through the valve, and the valve is mounted so as to communicate with a passage between the cyclone and the fan so that air pressure within the passage acts on one side of the closure while the other side of the closure is exposed to ambient air pressure, whereby in use if the air pressure in the passage leading from the cyclone to the fan falls sufficiently below ambient, so that the pressure differential acting on the closure creates a force sufficient to overcome the resilient force acting on the closure, the closure will become displaced from the seating and allow air to enter the passage to maintain an air flow over the fan motor.

Typically the closure is urged into the closed position by a resiliently deformable member acting on the one side of the closure.

Preferably the closure is located within a hollow housing and the resiliently deformable member is a spiral spring which acts between the rear surface of the closure and one end of the housing and an opening is provided in the opposite end defining the valve seating, the size of the opening being less than the size of the closure.

Preferably an elongate guide extends rearwardly from the centre of the closure and the said one end of the housing has an opening therein within which the guide is a sliding fit.

The closure may be a generally flat plate or may be shaped so as to provide a curved or conical or frusto-conical surface for contacting and sealing against the seating.

Typically the seating is a circular opening and the closure is at least hemispherical with its convex surface towards the seating and the radius of the closure is greater than the radius of the seating.

Preferably the seating includes or is formed from or coated or covered by a ring of resiliently deformable material, such as rubber, typically an O-ring seal, and the closure is adapted to make contact with the ring of deformable material so as to ensure a good airtight seal when pressed thereagainst.

Preferably the closure is a hollow sphere or ball and preferably is formed from low-density plastics material and is thin walled so as to have very low mass. In a preferred embodiment the ball includes openings in the wall of the half thereof which is remote from the half which co-operates with the annular seating, so that the pressure within the ball is always the same as the pressure within the housing.

Where the closure is a hollow ball the guide may be hollow and open at both ends to communicate between the interior of the ball and the passageway and where the wall of the latter is provided with one or more openings, ambient air released into the housing due to a pressure differential acting on the ball sufficient to unseat the ball from the seating, can pass from the housing via the ball and interior of the guide to the passage between cyclone and fan, to increase the air flow to the fan and therefore over the motor.

In addition or instead the said one end wall of the housing may be formed with one or more openings to communicate between the passage and the interior of the housing through which ambient air can pass when the valve is opened due to the occurrence of the aforementioned pressure differential.

The housing may be cylindrical and made from two cylindrical parts, which can be joined as by screw threaded engagement, one part having the opening defining the valve seating in an end thereof and its other end being open, and the other part having the opening for the guide with or without other openings to provide for airflow between the housing and the said passage and likewise being open at its other end, and the two open ends of the two parts are adapted to be joined to form the closed cylindrical housing.

Preferably the end of the housing having the opening for the guide therein is adapted to be fitted into or around a port in the wall of the said passage, so as to attach the housing to the apparatus.

In a preferred arrangement a helical spring is fitted around the elongate guide to be freely slidable relative thereto. If a pressure differential builds up across the closure to lift it off the seat, the guide slides relative to and through the said one end of the housing containing the opening therefor, and the spring becomes compressed between the ball and the said one end of the housing, the compression storing energy in the spring which creates a restoring force acting on the closure to move the latter back into sealing engagement with the seating when the pressure differential drops, such as will occur due to clearance of the blockage upstream of the passage, or after the fan motor is switched off.

The invention will now be described by way of example with reference to the accompanying drawing in which:

FIG. 1 is a side elevation in cross-section of a cyclone separator having a valve constructed as an embodiment of the invention connected thereto, and FIGS. 2, 3 and 4 illustrate alternative closure members for the valve.

In FIG. 1 item 10 is a detachable dust-collecting vessel and 12 is the main body of the device housing a cyclone dust/dirt separator. Air is drawn through the apparatus by a fan 14 driven by an electric motor 16 supported within a cylindrical air outlet passage 18 so that air can pass upwardly around the motor under the action of the fan 14.

Dust laden air enters the apparatus via inlet 20 which may be connected to a flexible tube leading to a rigid tube having a vacuum cleaner head at its remote end as is provided with a conventional domestic or industrial vacuum cleaner.

The cyclone separation apparatus within 10, 12 is not the subject of this Patent Application but may be constructed in accordance with what is illustrated and described in UK Patent Application Nos. 0116410.2, 0116409.4, 0116407.8 and 0116411.0.

A passage 22 extends from the output 24 of the separation apparatus 10, 12 to a housing 26 containing the fan 14 and motor 16. The wall of the passage includes an opening leading to a side tube defining a port 27 over which one end 28 of a tubular housing 30 is a tight push fit. The remainder of the housing 30 is generally cylindrical and hollow and its two ends are closed except to define a circular opening 32 carrying an O-ring defining a valve seating 34 at the outboard end, and at the other inboard end an opening for slidably receiving a radially extending elongate protrusion 36 which comprises a guide for a valve closure comprised of a hollow spherical shell 38 from which the guide 36 extends radially. The shell has openings 40, 42. The closure 38 is urged into contact with the O-ring by a helical compression spring 44 freely slidable on the guide 36 and trapped between the inboard end 46 of the housing 30 and the rear of the closure.

The spring rate of the compression spring 44 is selected so as to keep the closure in sealing engagement with the O-ring 34 unless a pressure differential occurs across the closure (caused by a blockage or partial blockage of the air path upstream of the passage 22) sufficient to compress the spring and open the valve. This can occur if for example the vacuum cleaner head is held in contact with a flat surface so that little or no air can enter it, or if a build up of dirt and dust occurs in a flexible tube leading to the inlet 20, or in the path leading to, through, or from the cyclone separator within 10, 12.

The housing 30 may be formed from two cylindrical shells 29, 31 one of which will screw threadedly engage the other as at 33.

The push fit of 28 onto 27 may be replaced by a screw-threaded engagement, or the two parts may be adhesively bonded, or may be welded.

A filter (not shown) may be provided downstream of the motor e.g. at the entrance to the housing 26 from the passage 22.

Instead of, or in addition to, the air passage provided by the openings 40, 42 and the hollow interiors of 38 and 36, between the housing 30 and the passage 22, openings such as 48, 50 may be provided in the end wall 46 around the opening in which 36 is slidably received.

Alternative closures are shown in FIGS. 2, 3 and 4.

Thus in FIG. 2 the spherical ball 38 of FIG. 1 is replaced by a hemispherical shell 38' having openings 40'/42' around the skirt portion thereof to allow air to pass into the hollow interior of the shell and guide 36', from which the shell protrudes for sliding in the opening in the inboard housing end 46 as illustrated in FIG. 1. The domed end of the hemispherical shell 38' co-operates with the O-ring 34 as described in relation to FIG. 1, so as to close the valve unless the pressure difference across the valve closure exceeds the force exerted by the spring 44.

FIG. 3 illustrates a closure in which the spherical shell 38 is replaced by a cylindrical shell 38" which therefore presents a flat end face 39 to the O-ring 34 against which it is pressed by the spring 44, to close the valve. Openings 40"/42" around the cylindrical wall of the shell 38" allow air to pass through to the hollow interior of shell 38" and guide 36" to pass into the airstream in 22 as in FIGS. 1 and 2.

FIG. 4 shows a further variation in which the shell 38'" is a generally conical pyramid shape with the apex formed as a domed nose. Openings 40'"/42'" are provided around the inclined pyramid wall of the shell to allow air to pass to the interior and via hollow guide 36'" into 22. The inclined surface of the conical pyramid shape co-operates with the O-ring 34 to close the valve.

The invention claimed is:

1. A particle separation apparatus comprising a cyclone particle separating means, particle collecting chamber and a fan driven by an electric motor for drawing particle laden air into and through the apparatus wherein a valve is provided, upstream of the suction fan driving motor and downstream of the cyclone particle separating means, which includes a valve closure and a valve seat against which the valve closure is normally resiliently urged to prevent air flowing through the valve, and the valve is mounted so as to communicate with a passage between the cyclone particle separating means and the fan so that air pressure within the passage acts on one side of the valve closure while the other side of the valve closure is exposed to ambient air pressure, whereby in use if the air pressure in the passage leading from the cyclone particle separating means to the fan falls below ambient by more than a predetermined amount, the pressure differential acting on the valve closure creates a force sufficient to overcome the resilient force acting thereon and the valve closure will become displaced from the valve seat and allow air to enter the passage to maintain an air flow to and around the fan motor, wherein the valve seat is a circular opening and the valve closure is a hollow ball with its convex curved surface towards the valve seat and the radius of curvature of the curved surface of the valve closure is greater than the radius of the circular opening forming the valve seat, and wherein the valve closure is urged into the closed position by a spiral spring acting on the one side of the valve closure, and wherein the valve closure is located within a hollow housing and the spiral spring acts between the rear of the valve closure and one end of the housing and an opening is provided in the opposite end of the housing defining the valve seat, and the area of the opening is less than the area of the valve closure, and wherein an elongate guide extends rearwardly from the valve closure and the said one end of the housing has an opening therein within which the guide is a sliding fit, and wherein the guide is hollow and open at both ends to communicate between the interior of the ball and the passage, whereby ambient air released into the housing due to a pressure differential acting on the ball sufficient to unseat the ball from the valve seat, can pass from the housing via the ball and interior of the guide to the passage between cyclone and fan, to increase the air flow to and around the motor.

2. Apparatus as claimed in claim 1 wherein the valve seat includes or is formed from or coated or covered by a ring of resiliently deformable material so that an airtight seal is created when the valve closure is pressed thereagainst.

3. Apparatus as claimed in claim 2 wherein the ring is formed from rubber.

4. Apparatus as claimed in claim 3 wherein the ring is an 0-ring seal.

5. Apparatus as claimed in claim 1 wherein the ball is spherical and is formed from low-density plastics material.

6. Apparatus as claimed in claim 1 wherein the ball includes at least one opening in the wall of the half thereof which is remote from the half which co-operates with the valve seat, so that the pressure within the bail is always the same as the pressure within the housing.

7. Apparatus as claimed in claim 1 wherein the said one end wall of the housing is formed with at least one opening to communicate between the interior of the housing and the passage through which ambient air can pass when the valve is opened.

8. Apparatus as claimed in claim 7 wherein the housing is cylindrical.

9. Apparatus as claimed in claim 8 wherein the housing is formed from two cylindrical parts, one part having an opening defining the valve seat in an end thereof and its other end being open, and the other part having an opening for the guide in one end thereof and is likewise open at its other end, and the two open ends of the two parts are adapted to be joined the one to the other so that the two parts extend coaxially and form the cylindrical housing.

10. Apparatus as claimed in claim 9 wherein the said one end of the said other part includes at least one other opening to provide for airflow between the housing and the said passage.

11. Apparatus as claimed in claim 7 wherein the end of the housing having the opening for the guide therein is adapted to be fitted into or around a port in a wall of the said passage, so as to attach the housing to the apparatus and communicate with the passage via the said port.

12. A particle separation apparatus comprising a cyclone particle separating means, particle collecting chamber and a fan driven by an electric motor for drawing particle laden air into and through the apparatus wherein a valve is provided, upstream of the suction fan driving motor and downstream of the cyclone particle separating means, which includes a valve closure and a valve seat against which the valve closure is normally resiliently urged to prevent air flowing through the valve, and the valve is mounted so as to communicate with a passage between the cyclone particle separating means and the fan so that air pressure within the passage acts on one side of the valve closure while the other side of the valve closure is exposed to ambient air pressure, whereby in use if the air pressure in the passage leading from the cyclone particle separating means to the fan falls below ambient by more than a predetermined amount, the pressure differential acting on the valve closure creates a force sufficient to overcome the resilient force acting thereon and the valve closure will become displaced from the valve seat and allow air to enter the passage to maintain an air flow to and around the fan motor, wherein the valve seat is a circular opening and the valve closure is at least hemispherical with its convex curved surface towards the valve seat and the radius of curvature of the curved surface of the valve closure is greater than the radius of the circular opening forming the valve seat, and wherein the valve closure is urged into the closed position by a spiral spring acting on the one side of the valve closure, and wherein the valve closure is located within a hollow housing and the spiral spring acts between the rear of the valve closure and one end of the housing and an opening is provided in the opposite end of the housing defining the valve seat, and the area of the opening is less than the area of the valve closure, and wherein an elongate guide extends rearwardly from the valve closure and the said one end of the housing has an opening therein within which the guide is a sliding fit and wherein a helical spring is fitted around the elongate guide and the spring and guide are freely relatively slidable, and wherein when the valve closure is lifted off the valve seat, the guide slides relative to and through the said one end of the housing containing the opening therefor, the spring becomes compressed between the valve closure and the said one end of the housing, and the compression stores energy in the spring which creates a restoring force acting on the valve closure to move the latter back into sealing engagement with the valve seat when a pressure differential causing the initial lifting of the valve closure drops, such as occurs when a blockage upstream of the passage is cleared, or after the fan motor is switched off.

* * * * *